J. GERSITZ.
VEHICLE TIRE.
APPLICATION FILED AUG. 9, 1912.
1,066,808. Patented July 8, 1913.
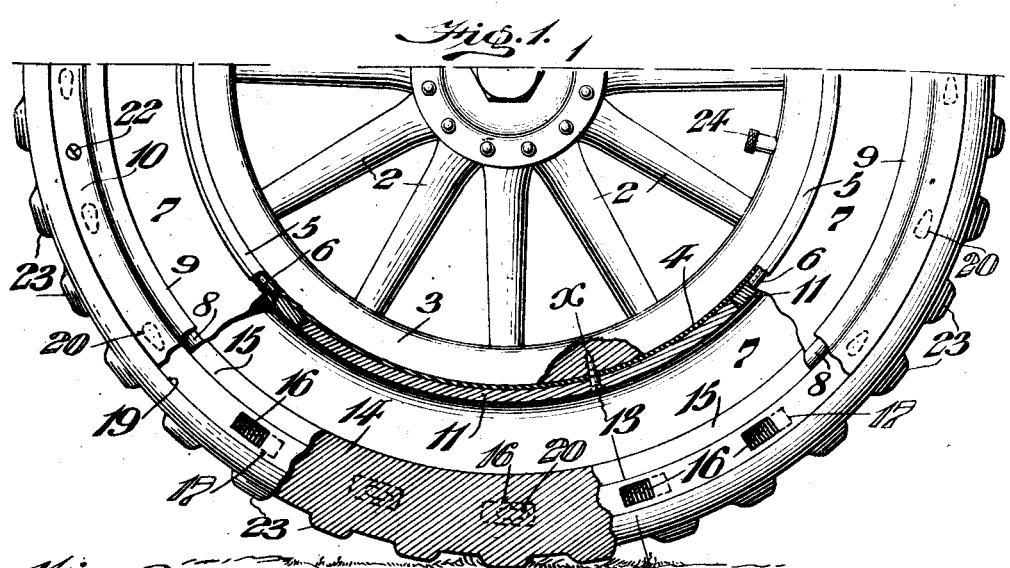
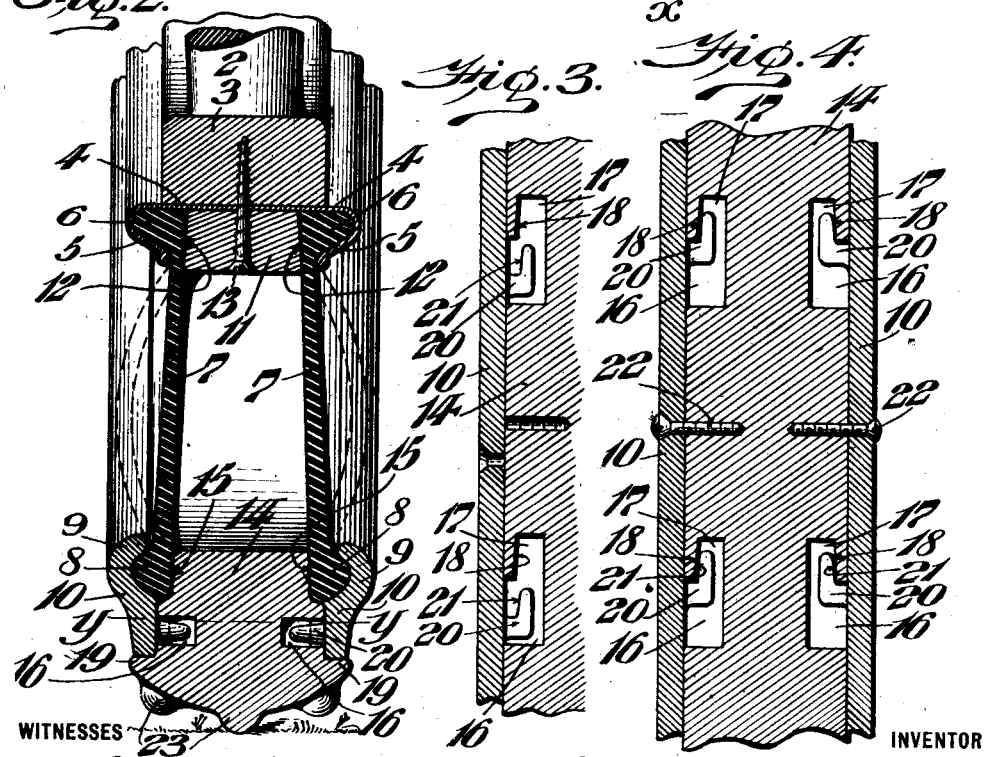

UNITED STATES PATENT OFFICE.

JULIUS GERSITZ, OF DOWNER, NEW JERSEY, ASSIGNOR OF ONE-HALF TO SAM FOLKMAN, OF PHILADELPHIA, PENNSYLVANIA.

VEHICLE-TIRE.

1,066,808.

Specification of Letters Patent.

Patented July 8, 1913.

Application filed August 9, 1912. Serial No. 714,195.

*To all whom it may concern:*

Be it known that I, JULIUS GERSITZ, a citizen of the United States, residing in the city of Downer and county of Gloucester, State of New Jersey, have invented a new and useful Vehicle-Tire, of which the following is a specification.

This invention relates to vehicle tires and more particularly to a wheel structure which may be employed in connection with any desired type of road vehicle being especially designed for use in conjunction with motor vehicles such as automobiles, motor cycles, auto-trucks, and the like, and has for an object to provide a wheel which not only gives the required and necessary resiliency but is furthermore puncture proof and not subject to blow-outs or like troubles.

It has for a further object to provide a vehicle tire embodying all the features of advantage due to pneumatic action and which in addition comprises details of construction which eliminate all danger of skidding or slipping on wet or oily pavements.

My invention comprises in its broad or generic scope a vehicle wheel provided with a circumferential pneumatic tube which is so constructed and arranged with respect to an armored tread as to form a complete unitary device adapted to stand up under all conditions of use, to which such a wheel is subjected, and which is puncture proof and incapable of side slipping or skidding.
It further consists of other novel features of construction, all as will be hereinafter fully set forth.

For the purpose of illustrating my invention, I have shown in the accompanying drawings one form thereof which is at present preferred by me, since the same has been found in practice to give satisfactory and reliable results, although it is to be understood that the various instrumentalities of which my invention consists can be variously arranged and organized and that my invention is not limited to the precise arrangement and organization of these instrumentalities as herein shown and described.
Referring to the drawings: Figure 1 represents a side elevation of a portion of a vehicle wheel embodying my invention, certain parts being shown in section for clearness of illustration. Fig. 2 represents a section on line *x—x* of Fig. 1. Fig. 3 represents a section on line *y—y* of Fig. 2. Fig. 4 represents a similar section showing the parts in locked position.

Similar numerals of reference indicate corresponding parts in the figures.

1 designates the hub and 2 the spokes of a vehicle wheel embodying my invention, the said spokes 2 being secured at their outer ends to an inner felly 3, the outer peripheral surface of which is preferably of a suitable contour to form a seat for an inner rim member 4. This rim 4 in the present instance is of metal and is provided at each side thereof with an inwardly turned circumferential flange 5 forming a pocket at each side of the wheel adapted to receive a circumferential bead 6 formed as an integral part of a pneumatic tube member, the sides of which are designated by the reference numeral 7. The side members 7 of this tube are preferably of rubber or fabric suitably treated to give the required resiliency and toughness to the structure and have their outer ends terminating in a second circumferential bead 8, the function of which is to interlock with the lips 9 formed respectively on the side plates 10.

In order to secure the sides 7 of the tube to the rim 4 and felly 3 I preferably employ a plurality of blocks 11, the side portions 12 thereof being suitably beveled for contact engagement with the members 7 and it will be noted that these members 7 preferably diverge with respect to each other and have their inner ends nearer together than the outer ends. This construction permits the wedge blocks 11 to be inserted between the members 7 and drawn into place so that the side members 7 are forced apart and tightly clench the beads 6 within the pockets formed by the flanges 5 of the inner rim 4. The wedge blocks 11, in the present instance, are secured to the felly 3 by means of screws 13 or like fastening devices passing through the said blocks 11, the inner rim 4, and into the felly 3.

14 designates a tread member, preferably, of metal and of annular form having at each side of its inner periphery a circumferential groove 15 forming a seat for the outer pd of each of the side members 7, the said seats of course conforming in shape to the end configuration of said members 7.

16 designates a plurality of openings or sockets formed at suitable intervals in each side wall of the tread member 14, each of said openings communicating respectively with an adjacent recess 17, the side wall 18 of each of which is beveled for a purpose later to be described.

19 designates a circumferential extension formed on each side of the tread member 14 and forming a shoulder upon which the side plates 10 are respectively seated, the latter being held in place, in the present instance, by means of angular lugs 20 which are adapted to pass into the opening 16 and are provided with a beveled face 21 for frictional engagement with the face 18 of the recess 17. In positioning the plates 10 in operative position the lugs 20 are first inserted within the large opening 16 and then the plates are turned so as to bring the said lugs into the recess 17 thus locking the parts in assembled condition and their future displacement is prevented by inserting screws 22 or the like through the side plates into the tread member 14, thereby producing a strong and effective fastening of the parts. This operation is well illustrated in Figs. 3 and 4 in the former of which the initial relation of the plate 10 and tread member 14 is shown and in the latter the final or locked position.

23 designates a plurality of lugs formed on the outer peripheral or tread surface of the member 14, the said lugs forming an efficient anti-slipping device.

In assembling this form of my device the side members 7 are placed in position with their beaded portions seated within the flanges 5 of the rim member 4, after which the several sections or wedge blocks 11 are inserted between the said members 7 and drawn into place by the fastening devices 13 at the same time that the rim 4 is made fast to the felly 3. This action securely clamps or clenches the side members 7 at their inner ends and forms a joint which is leak proof and adapted to retain air within the tube members. The tread 14 is then positioned so that a portion of the beads 8 is seated within the grooves 15 whereupon the side plates are fitted over the said beads and forced into place by sliding them in the proper direction to bring the wedge surfaces 18 and 21 into interlocking relation. The screws 22 may now be inserted and the entire structure becomes a substantial, complete, unitary tire or wheel member, the two portions of which may be inflated with air through a suitable valve 24 provided for the purpose.

It will now be apparent that I have devised a complete unitary structure well adapted for the purpose intended and which in use preserves the full resilience of an ordinary pneumatic tire, but is not subject to puncturing since the provision of a tread formed of puncture-proof material, the pneumatic portion of the device embodied within the side member 7, is not exposed to contact with the road.

It will now be apparent that I have devised a novel and useful construction of a vehicle tire which embodies the features of advantage enumerated as desirable in the statement of the invention and the above description and while I have, in the present instance, shown and described a preferred embodiment thereof which has been found in practice to give satisfactory and reliable results, it is to be understood that the same is susceptible of modification in various particulars without departing from the spirit or scope of the invention or sacrificing any of its advantages.

Having thus described my invention, what I claim as new and desire to secure by Letters Patent is as follows:—

1. In a resilient wheel, a hub, a felly carried thereby, a rim adapted to seat on said felly, an inwardly turned circumferential flange on each side of said rim forming a pocket, resilient side members, a circumferential bead formed on each member and adapted to seat in said pockets of said rim, a plurality of wedge blocks located between said side members, means to secure said blocks, rim and felly together to lock said side members to said rim, an annular tread formed of puncture-proof material and having a plurality of openings in each side thereof, side plates for said tread member, an outer circumferential bead formed on each resilient side member, a lip on each side plate adapted to engage said bead, a plurality of lugs on each side plate and corresponding in number to said tread openings, and means to interlock said lugs with said tread openings whereby said tread adjuncts are maintained in assembled condition.

2. In a resilient wheel, a hub, a felly carried thereby, a rim adapted to seat on said felly, an inwardly turned circumferential flange on each side of said rim forming a pocket, resilient side members, an inner and an outer circumferential bead formed on each side member, said inner beads being adapted to seat in said rim pockets, a plurality of wedge blocks located between said members, means to secure said blocks, rim and felly together to lock said side members to said rim, an annular tread formed of puncture-proof material and having a plurality of openings in each side thereof, a recess communicating with each opening, a bevel wall in each recess, side plates for said tread, a circumferential lip on each plate adapted to engage said outer circumferential bead on said side members, a plurality of lugs on each side plate corresponding in number to said openings, a bevel face on each lug adapted to contact with said recess bevel face, and means to lock said side plates to said tread member whereby said lugs are retained in said recesses and said tread adjuncts in assembled condition.

3. In a resilient wheel, a hub, a felly carried thereby, a rim adapted to seat on said felly, an inwardly turned circumferential flange on each side of said rim forming a pocket, resilient side members, an inner and an outer circumferential bead formed on each side member, said inner beads being adapted to seat in said rim pockets, inner and outer internal spacing devices for said side members, an annular tread formed of puncture-proof material and having a plurality of openings in each side thereof, side plates for said tread member, angular internal lugs 20 on said side plates, said lugs being adapted to be inserted in the openings in said tread and to be moved so as to interlock with said openings, and fastening devices for said side plates and tread whereby said lugs are held in locked position within their openings.

JULIUS GERSITZ.

Witnesses:
SAM FOLKMAN,
C. D. McVAY.